US00RE40501E

(19) United States
(12) Reissued Patent
Henry et al.

(10) Patent Number: US RE40,501 E
(45) Date of Reissued Patent: Sep. 16, 2008

(54) NICKEL-BASE SUPERALLOYS AND ARTICLES FORMED THEREFROM

(75) Inventors: Michael Francis Henry, Niskayuna, NY (US); Elena Rozier, Niskayuna, NY (US); Samuel Vinod Thamboo, Latham, NY (US); Sarwan Kumar Mannan, Barboursville, WV (US); John Joseph deBarbadillo, II, Barboursville, WV (US)

(73) Assignee: General Electric Company, Schenectady, NY (US)

(21) Appl. No.: 11/077,572

(22) Filed: Mar. 10, 2005

Related U.S. Patent Documents

Reissue of:
(64) Patent No.: 6,531,002
Issued: Mar. 11, 2003
Appl. No.: 09/841,326
Filed: Apr. 24, 2001

(51) Int. Cl.
*C22C 19/05* (2006.01)

(52) U.S. Cl. ..... 148/409; 148/428; 420/448
(58) Field of Classification Search ..... None
See application file for complete search history.

(56) References Cited

U.S. PATENT DOCUMENTS 3,046,108 A * 7/1962 Eiselstein ..... 420/448
4,888,253 A * 12/1989 Snyder et al. ..... 428/680
4,979,995 A * 12/1990 Hattori et al. ..... 148/675
4,981,644 A * 1/1991 Chang ..... 420/442
5,129,969 A * 7/1992 Henry ..... 148/428
5,338,379 A * 8/1994 Kelly ..... 148/410
5,556,594 A * 9/1996 Frank et al. ..... 420/448
5,679,180 A * 10/1997 DeLuca ..... 148/404

FOREIGN PATENT DOCUMENTS

GB 2270324 A * 3/1994
JP 59-211560 A * 11/1984

OTHER PUBLICATIONS

"Nickel, Cobalt, and Their Alloys", pub. ASM International, 2000 (no month), pp. 69–77, 82–83, 233–234 and 302–303.*

* cited by examiner

*Primary Examiner*—Harry D Wilkins, III
(74) *Attorney, Agent, or Firm*—McNees Wallace & Nurick LLC

(57) ABSTRACT

An article, such as a turbine engine component, formed from a nickel-base superalloy, the nickel-base superalloy containing a γ" tetragonal phase and comprising aluminum, titanium, tantalum, niobium, chromium, molybdenum, and the balance nickel, wherein the article has a time dependent crack propagation resistance of at least about 20 hours to failure at about 1100° F. in the presence of steam. The invention also includes a nickel-base superalloy for forming such and article and methods of forming the article and making the nickel-base superalloy.

83 Claims, 3 Drawing Sheets

NICKEL-BASE SUPERALLOYS AND ARTICLES FORMED THEREFROM

Matter enclosed in heavy brackets [ ] appears in the original patent but forms no part of this reissue specification; matter printed in italics indicates the additions made by reissue.

BACKGROUND OF THE INVENTION

The invention relates to articles, such as, but not limited to, turbine engine components, that have high yield strength and time-dependent crack propagation resistance. More particularly, the invention relates to articles that have high yield strength and time-dependent crack propagation resistance and are formed from nickel-based superalloys. Even more particularly, the invention relates to nickel-based superalloys that are used to form articles, such as turbine engine components, that exhibit both high yield strength and time-dependent crack propagation resistance.

During operation of jet and land-based turbine engines, high temperatures and stresses are normally encountered. In order to function properly over extended periods of time, the components within these turbine engines must retain high strength and other properties at temperatures in excess of 850° F. Nickel-base superalloys have long been recognized as having properties at elevated temperatures that are superior to those of steel-based components, such as turbine wheels, and which meet the performance requirements of turbines. Precipitates of a γ" ("gamma double prime") phase are believed to contribute to superior performance of many of these nickel-base superalloys at high temperatures. Consequently, nickel-base superalloys such as Alloy 706 have been widely used to form components in turbines that are used for land-based power generation.

Newer turbine engine designs have imposed even more demanding requirements upon the properties of materials that are used to form components. In addition to higher operating temperatures and stresses than those encountered in previous designs, the newer turbine engines can present a different operating environment that is potentially more aggressive than that of earlier turbines. One example of a more aggressive operating environment is the use of steam to cool hot gas path materials in the current generation of power turbine engines. Thus, materials having improved properties are needed to deliver a performance level that was not contemplated in the previous generation of turbine engines.

Turbine engine components, as well as other articles, formed from nickel-base superalloys can be subjected to time-dependent propagation of cracks that are either incipient or formed during fabrication or use of the component. Time-dependent crack propagation depends on both the frequency of stress application and the time spent under stress, or "hold-time." A discussion of the dependence of crack propagation upon frequency and hold time can be found in U.S. Pat. No. 5,129,969 issued Jul. 14, 1992, to M. Henry and assigned to the same assignee as the present application. Because such cracks tend to grow while the component is under the stress of turbine engine operation and can lead to catastrophic failure of the component as well as the entire turbine engine, it is desirable that a component possess a certain level of time-dependent crack propagation resistance (TDCPR) at its service temperature. The TDCPR of an alloy or an article formed from the alloy can be expressed in hours to failure at a given temperature and fracture mechanics driving force.

During operation, gas turbine discs are subjected to large radial temperature gradients. In particular, land-based gas turbine engines operate with long hold times at high temperature. For these applications, strength properties can dominate and drive the bore design, whereas resistance to time-dependent crack growth can dominate the rim design. Turbine wheels or discs must therefore possess adequate time-dependent crack propagation resistance in the rim regions of the wheel at one temperature and adequate tensile strength at a second, lower temperature in the area surrounding the bore of the wheel. It is therefore desirable that the turbine wheels be formed from a material that provides the necessary combination of TDCPR and strength at high temperatures.

The nickel-base superalloys that are either being used in current turbines or are being considered for use in proposed turbine engine designs do not possess the necessary combination of crack propagation resistance and strength. Alloy 718, for example, has been chosen as a turbine wheel material due to its acceptable TDCPR in the steam environment of current turbine designs, but its TDCPR could be inadequate in more advanced designs. Alloy 625 has excellent crack propagation resistance, but has insufficient strength for turbine wheel applications. Commercially available alloys such as ASTROLOY™ have good combinations of TDCPR and strength when the material is processed to form articles that are sized small enough to be cooled quickly—i.e., at rates between about 150° F. and about 600° F. per minute—from the solutioning temperature. When processed on the scale of modern land-based gas turbine wheels, however, such alloys have inadequate strength. This is due in part to the fact that the alloy that is obtained is a γ' ("gamma prime") strengthened alloy rather than a γ" ("gamma double prime") strengthened alloy. The γ' strengthened alloy exhibits accelerated precipitation kinetics.

As their operational parameters are extended, both land-based and jet turbine engines will need to incorporate components that are formed from materials that possess the time dependent crack propagation resistance and strength required for these applications. Therefore, what is needed is an article, such as a turbine engine component, that possesses adequate time dependent crack propagation resistance at high temperatures. What is also needed is an article that possesses a combination of time dependent crack propagation resistance and strength at high temperatures. What is further needed is a nickel-base superalloy that can be formed into an article, such as a turbine engine component, having the necessary combination of TDCPR and strength at high temperatures.

BRIEF SUMMARY OF THE INVENTION

The present invention satisfies these needs and others by providing an article, such as, but not limited to, turbine engine components formed from a nickel-base superalloy. The article formed from the nickel-base superalloy has the time dependent crack propagation resistance (TDCPR) and strength that meet the performance requirements of high strength, high temperature systems, such as a turbine engine. Methods of making the superalloy and the article from the superalloy having these properties are also disclosed.

Accordingly, one aspect of the present invention is to provide an article formed from a nickel-base superalloy, the nickel-base superalloy containing a γ" tetragonal phase and comprising aluminum, titanium, tantalum, niobium, chromium, molybdenum, and the balance nickel, wherein the article has a time dependent crack propagation resistance of at least about 20 hours to failure at about 1100° F. in the presence of steam under the screening conditions used in this study.

A second aspect of the present invention is to provide a nickel-base superalloy for forming an article. The nickel-base superalloy contains a γ" tetragonal phase and comprises aluminum, titanium, tantalum, niobium, chromium, molybdenum, at least one element selected from the group consisting of iron and cobalt, and the balance nickel, wherein the nickel-base superalloy turbine component has a crack propagation resistance of at least 20 hours to failure at about 1100° F. in the presence of steam and a yield strength of greater than 130 ksi at about 750° F.

A third aspect of the present invention is to provide an article formed from a nickel-base superalloy, the nickel-base superalloy containing a γ" tetragonal phase and comprising aluminum, titanium, tantalum, niobium, chromium, molybdenum, at least one element selected from the group consisting of iron and cobalt, and the balance nickel, wherein the article has a crack propagation resistance of at least 20 hours to failure at about 1100° F. in the presence of steam and a yield strength of greater than 130 ksi at about 750° F.

A fourth aspect of the present invention is to provide a method of making a nickel-base superalloy billet containing a γ" tetragonal phase and having a crack propagation resistance of at least 20 hours to failure at about 1100° F. in the presence of steam and a yield strength of greater than 130 ksi at about 750° F. The method comprises the steps of: forming an ingot of the nickel-base superalloy; remelting the ingot a first time; remelting the ingot a second time; homogenizing the ingot; and billetizing the ingot, thereby creating the nickel-base superalloy billet.

A fifth aspect of the present invention is to provide a method of making a nickel-base superalloy article containing a γ" tetragonal phase and having a crack propagation resistance of at least 20 hours to failure at 1100° F. in the presence of steam and a yield strength of greater than 130 ksi at about 750° F. The method comprises the steps of: forming an ingot of the nickel-base superalloy; remelting the ingot a first time; remelting the ingot a second time; homogenizing the ingot; billetizing the ingot, thereby creating a billet; and hot-working the billet to form the article.

These and other aspects, advantages, and salient features of the invention will become apparent from the following detailed description, the accompanying drawings, and the appended claims.

DETAILED DESCRIPTION OF THE INVENTION

Figure 1:
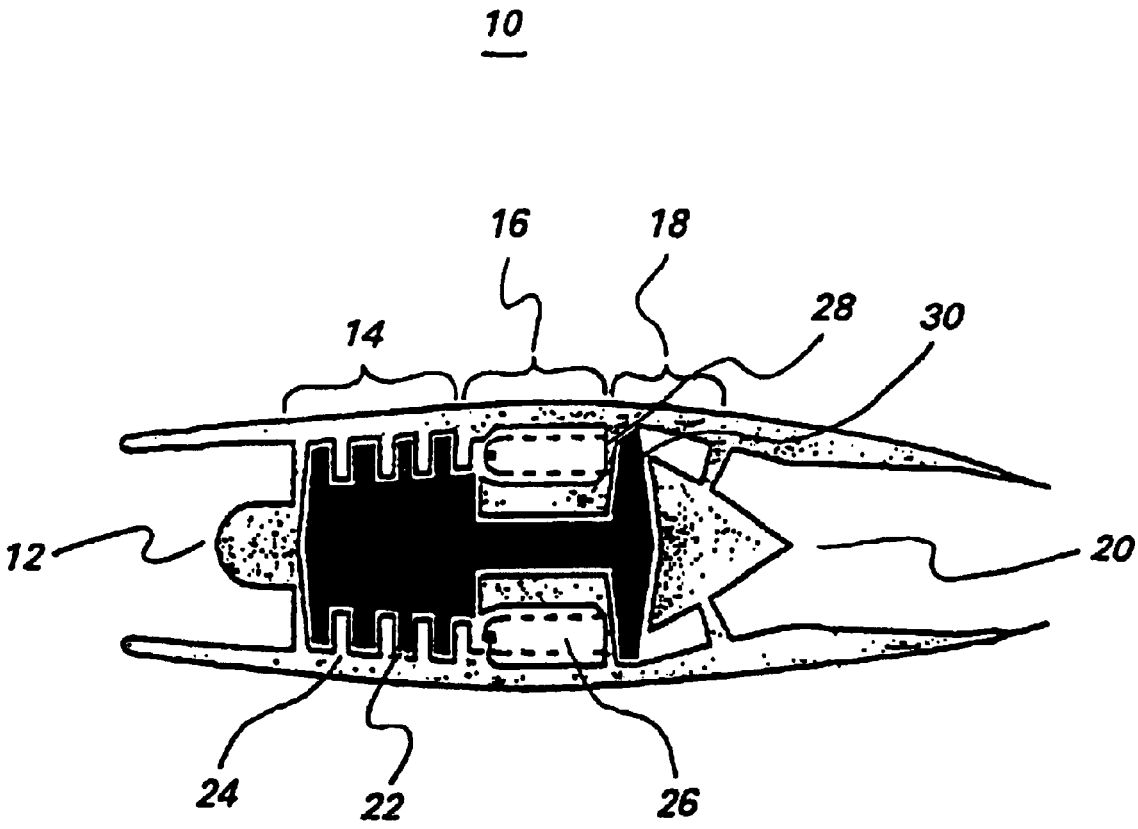
FIG. 1 is a schematic diagram of a turbine engine.

In the following description, like reference characters designate like or corresponding parts throughout the several views shown in the figures. It is also understood that terms such as "top," "bottom," "outward," "inward," and the like are words of convenience and are not to be construed as limiting terms.

Referring to the drawings in general and to FIG. 1 in particular, it will be understood that the illustrations are for the purpose of describing a preferred embodiment of the invention and are not intended to limit the invention thereto. It is understood that articles other than turbine components, for which the combination of strength and resistance to high temperature time-dependent crack growth are desired, are considered to be within the scope of the present invention. Such articles include, but are not limited to, tooling, valves, and down-hole equipment used in oil field operations. FIG. 1 is a schematic diagram of a turbine engine 10 that includes at least one turbine engine component 11 of the present invention. The turbine engine 10 may either be a land-based turbine, such as those widely used for power generation, or an aircraft engine. Air enters the inlet 12 of the turbine engine 10 and is first compressed in the compressor 14. The high pressure air then enters the combustor 16 where it is combined with a fuel, such as natural gas or jet fuel, and burned continuously at a constant pressure. The hot, high pressure air exiting the combustor 16 is then expanded through a turbine 18, where energy is extracted to power the compressor, before exiting the turbine engine 10 through a discharge outlet 20.

The turbine engine 10 comprises a number of turbine components 11 of the present invention that are subject to high temperatures and/or stresses during operation. These turbine components 11 include, but are not limited to: rotors 22 and stators 24 in the compressor 14; combustor cans 26 and nozzles 28 in the combustor 16; discs, wheels and buckets 30 in the turbine 18; and the like. In the present invention, the turbine components 11 are formed from nickel-base superalloys having compositions in the ranges described herein and a crack propagation resistance (TDCPR) of at least 20 hours to failure at 1100° F. in the presence of steam under the conditions described herein, which is the TDCPR of Alloy 718. Preferably, the turbine components 11 have a crack propagation resistance of at least 200 hours to failure at 1100° F. in the presence of steam. Most preferably, the turbine engine 10 includes turbine components 11 having a TDCPR of at least 1000 hours to failure at 1100° F. in the presence of steam.

Figure 2:
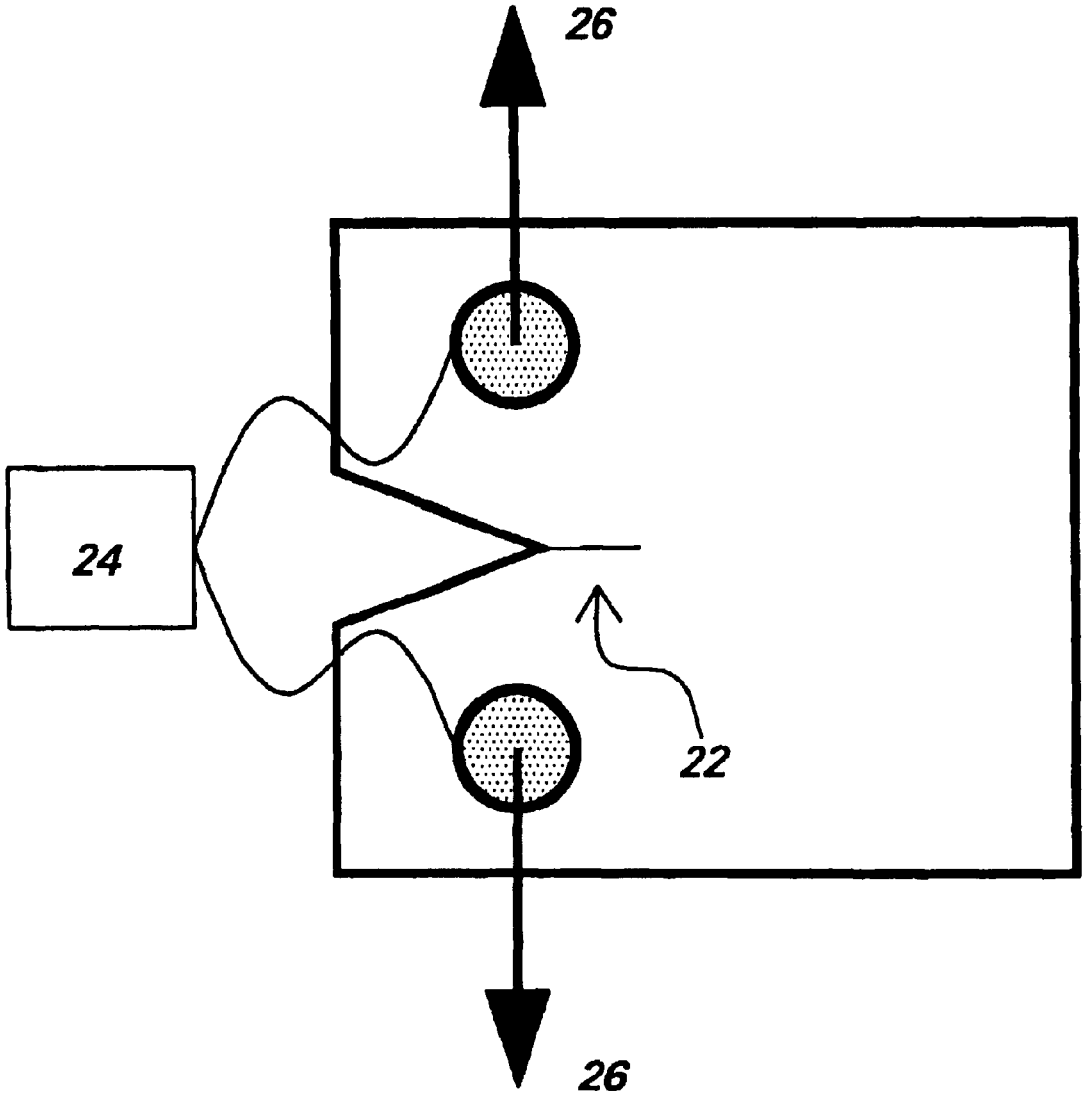
FIG. 2 is a schematic diagram representing the time dependent crack propagation resistance (TDCPR) screening test.

FIG. 2 is a schematic representation of a static crack growth test for determining the crack propagation resistance of a material or an article formed from the material. A fatigue pre-crack 32 is created in a test article 30 formed from the material and the test article 30 is heated to the test or service temperature in the presence of steam. A steam environment is used in the static growth tests because steam is generally considered to be a more hostile environment than air for intergranular cracking in nickel-base superalloys. The performance of the alloys of the present invention in air is found to be superior to their performance in the presence of steam. Thus, test results obtained in the presence of steam for the alloys represent a lower performance limit of the alloys. A stress intensity factor 36 of 26 ksi/in$^2$ is applied to the fatigue pre-crack 32. The growth rate of the fatigue pre-crack 32 is monitored until the test article 30 fails, or until a preselected time is reached, in which case the time dependent portion of the crack advance is measured. Depending on whether the test article 30 fails or the preselected time is reached, either the time to failure or the degree of crack advance can be correlated with static crack growth rates.

The article of the present invention, which may be a turbine component 11 of the turbine engine 10, is formed from a nickel-base superalloy. To form an article having a crack propagation resistance that is at least equal to that of Alloy 718, the nickel-base superalloy used to form the article has a γ" tetragonal phase and comprises aluminum, titanium, tantalum, niobium, chromium, molybdenum, and the balance nickel. The nickel-base superalloy may further include cobalt and iron and comprises: between about 0.05 and about 2.0 weight percent aluminum; up to about 10 weight percent cobalt; between about 15 and about 25 weight percent chromium; up to about 40 weight percent iron; up to about 12 weight percent molybdenum; between about 2 and about 7 weight percent niobium; up to about 6 weight percent tantalum; up to about 2.5 weight percent titanium; and a balance of nickel.

Preferably, the article of the present invention has a crack propagation resistance of at least 200 hours to failure at 1100° F. in the presence of steam under the test conditions described herein. As embodied in the present invention, articles having this level of TDCPR are formed from a nickel-base superalloy comprising: between about 0.05 and about 0.5 weight percent aluminum; up to about 5 weight percent cobalt; between about 19 and about 22 weight percent chromium; up to about 8.0 weight percent iron; between about 6 and about 9 weight percent molybdenum; between about 3.3 and about 5.4 weight percent niobium; up to about 3 weight percent tantalum; between about 0.2 and about 1.6 weight percent titanium; and a balance of nickel.

In another embodiment of the present invention, the nickel-base superalloy comprises: between about 0.1 and about 0.6 weight percent aluminum; up to about 5 weight percent cobalt; between about 19 and about 22 weight percent chromium; up to about 8.0 weight percent iron; between about 6 and about 9 weight percent molybdenum; between at least 3.5 and about 5.1 weight percent niobium; up to about 3 weight percent tantalum; between about 0.6 and about 2.0 weight percent titanium; and a balance of nickel. More preferably, the nickel-base superalloy comprises: between about 0.2 and about 0.6 weight percent aluminum; up to about 5 weight percent cobalt; between about 19 and about 22 weight percent chromium; up to about 8.0 weight percent iron; between about 6 and about 9 weight percent molybdenum; between at least 3.6 and about 5.5 weight percent niobium; up to about 3 weight percent tantalum; between about 0.6 and about 2.0 weight percent titanium; and a balance of nickel. Even more preferably, the nickel-base superalloy comprises: between about 0.2 and about 0.6 weight percent aluminum; about 21.5 weight percent chromium; about 2.5 weight percent iron; about 9 weight percent molybdenum; between at least 3.6 and about 5.5 weight percent niobium; up to about 3 weight percent tantalum; between about 0.6 and about 2.0 weight percent titanium; and a balance of nickel. Alternatively, the nickel-base superalloy preferably comprises: between about 0.1 and about 0.5 weight percent aluminum; between about 1.5 and about 5 weight percent cobalt; between about 19 and about 21 weight percent chromium; about 8.0 weight percent iron; between about 6 and about 9 weight percent molybdenum; at least 3.5 weight percent niobium; between about 2 and about 3 weight percent tantalum; between about 0.8 and about 1.0 weight percent titanium; and a balance of nickel.

Most preferably, the article of the present invention has a TDCPR of at least 1000 hours to failure at 1100° F. in the presence of steam. Alloy ARC017A, comprising about 0.5 weight percent aluminum, about 21.5 weight percent chromium, about 2.5 weight percent iron, about 9 weight percent molybdenum, about 5.1 weight percent niobium, about 0.9 weight percent titanium, and a balance of nickel; and alloy ARC054, comprising about 0.5 weight percent aluminum, about 5 weight percent cobalt, about 19 weight percent chromium, about 8 weight percent iron, about 0.4 weight percent molybdenum, about 3.5 weight percent niobium, about 3 weight percent tantalum, about 1.0 weight percent titanium, and a balance of nickel, are representative of nickel-base superalloys that can be used to form articles, including turbine components 11, having this level of time dependent crack propagation resistance.

As previously mentioned, turbine wheels or discs must possess adequate time dependent crack propagation resistance in the rim regions of the wheel at one temperature and adequate tensile strength at a second, lower temperature in the area surrounding the bore of the wheel. Thus, one embodiment of the invention includes an article, such as a turbine component 11, which, in addition to having a time dependent crack propagation resistance of at least 20 hours to failure at 1100° F. in the presence of steam, has a yield strength of 149 ksi, and, preferably, 160 ksi, at 750° F., under the test conditions described herein.

An article, such as a turbine component 11, of the present invention is formed from a nickel-base superalloy. The nickel-base superalloy can preferably be made by what is commonly referred to as a "triple melt" process, although it is readily understood by those of ordinary skill in the art that alternate processing routes may be used to obtain the microstructure of the nickel-base superalloys of the present invention. In the triple melt process, the constituent elements are first combined in the necessary proportions and melted, using a method such as vacuum induction melting or the like, to form a molten alloy. The molten alloy is then resolidified to form an ingot of the nickel-base superalloy. The ingot is then re-melted using a process such as electro-slag re-melting (ESR) or the like. A second re-melting is then performed using a vacuum arc re-melting (VAR) process.

Following the second re-melt, the ingot is homogenized by a heat treatment. The homogenizing heat treatment of the present invention is preferably performed at a temperature that is as close to the melting point of the material, while not encountering incipient melting, as is practical. The ingot is then subjected to a conversion process, in which the ingot is billetized, i.e., prepared and shaped for forging. The conversion process is carried out at temperatures below that used during the homogenization treatment and typically includes a combination of upset, heat treatment, and drawing steps in which additional homogenization occurs and the grain size in the ingot is reduced. The resulting billet is then hot-worked using conventional means, such as forging, to form the article. In order to control grain size, the forged article is then subjected to at least one solutioning step in which the article is heat treated at a temperatures below the solvus temperature of the highest temperature phase of the material to produce a partially solutioned nickel-base superalloy. Preferably, the solution step is carried out at a temperature below the δ-solvus or Laves solvus temperature of the nickel-base superalloy. In contrast, prior-art final forging heat treatments are often carried out above the δ-solvus temperature to produce a fully solutioned nickel-base superalloy. During the development of the alloys of the present invention, both partially solutioned (i.e., the final post-forging heat treatment was carried out below the δ-solvus temperature) and fully solutioned (i.e., the final post-forging heat treatment was carried out above the δ-solvus temperature) material test coupons were evaluated.

A list of compositions prepared according to the present invention is given in Table 1. In addition, the composition of several commercial alloys, such as Alloy 718, Alloy 625, and Alloy 725, are provided for comparison. Partially solutioned samples of Alloy 718, Alloy 625, and Alloy 725 were treated according to the method described herein. Table 2 lists the yield strengths at room temperature, 750° F., and 1100° F. and the static crack growth time-to-failure at 1100° F. in both air and steam for partially solutioned, heat treated alloys having the compositions listed in Table 1. The results listed for Alloy 625, and Alloy 725 are those obtained for samples treated according to the present invention. Yield strengths at 750° F. of the nickel-base superalloys of the present invention ranged from about 130 to about 160 ksi. The nickel-base superalloys of the present invention exhibited times-to-failure ranging from about 208 hours to at least about 3360 hours in a steam atmosphere. These time-to-failure values are superior to that measured for Alloy 718, which had a yield strength of 146 ksi at 750° F. and a time-to-failure of about 20 hours. The superalloys prepared according to the present invention also exhibited yield strengths at 750° F. that are comparable to or greater than that of Alloy 718. This effect is contrary to the general trend observed in prior-art nickel-base superalloys, in which any increase in time dependent crack growth is most often associated with a corresponding decrease in strength. In contrast to the alloys of the present invention, Alloy 625, while having a crack growth time-to-failure of about 1680 hours at 1100° F. in the presence of steam, lacks sufficient strength (94 ksi at 750° F.) for turbine applications such as wheels and discs. When treated according to the method of the present invention, Alloy 725 exhibited a time-to-failure of about 2140 hours. Table 3 lists the properties of fully solutioned nickel-base superalloys of the present invention as well as Alloy 718, Alloy 625, and Alloy 725. With the exception of alloys ARC067B and ARC076, the times-to-failure in steam exhibited by the fully solutioned alloys of the present invention and Alloys 718, 625, and 725, were less than the times-to-failure in steam of the corresponding partially solutioned alloys. The results indicate that the partial solution heat treatment of the present invention increases the time-to-failure of both the nickel-base superalloys of the present invention and the prior-art nickel-base superalloys.

Figure 3:
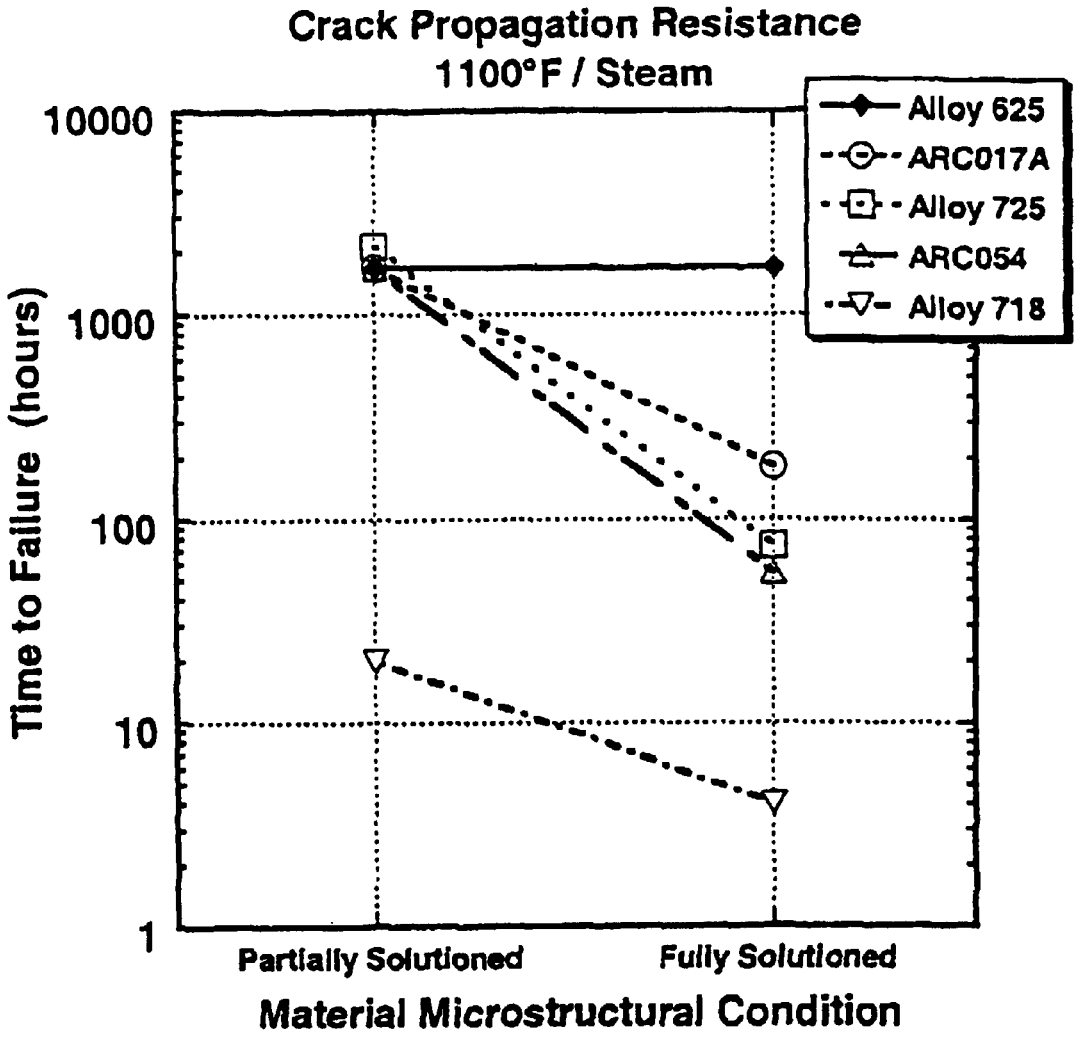
FIG. 3 is a plot of crack propagation resistance, measured for partially solutioned and fully solutioned alloys at 1100° F. in the presence of steam, for a nickel-base superalloy of the present invention and prior-art nickel-base superalloys.

The time dependent crack propagation resistances, measured for partially solutioned and fully solutioned alloys at 1100° F. in the presence of steam, of the nickel-base superalloys ARC054 and ARC017A of the present invention and the commercially available Alloy 718, Alloy 725, and Alloy 625 are compared in FIG. 3. In both fully solutioned and partially solutioned conditions, the nickel-base superalloys ARC054 and ARC017A of the present invention have greater crack growth times-to-failure than that of Alloy 718. Although Alloy 625 has a greater crack growth time-to-failure than ARC054, the prior-art alloy possesses insufficient strength for turbine applications such as wheels and discs. The values plotted in FIG. 3 also serve to illustrate that the partial solution heat treatment of the present invention increases the time-to-failure of both the nickel-base superalloys of the present invention and the prior-art nickel-base superalloys.

The nickel-base superalloys of the present invention collectively represent a unique combination of strength and ductility at both room temperature and high temperature and resistance to high temperature time-dependent crack growth. In addition, the nickel-base superalloys of the present invention are structurally stable and can be cast and forged into very large components while retaining grain sizes that provide good continuous low cycle fatigue resistance. Specifically, the alloys ARC017A, ARC054, and Alloy 725 have been scaled up using the previously described "triple melt" process to yield a vacuum arc re-melt (VAR) ingot having a diameter of about 20 inches. Each of the re-melted ingots having diameters of about 20 inches was converted to a billet having a diameter of about 10 inches.

TABLE 1

| | Compositions in Weight Percents | | | | | | | | |
|---|---|---|---|---|---|---|---|---|---|
| Alloy | Al (w/o) | Co (w/o) | Cr (w/o) | Fe (w/o) | Mo (w/o) | Nb (w/o) | Ni (w/o) | Th (w/o) | Ti (w/o) |
| ARC009 | 0.25 | 0.0 | 20.0 | 37.5 | 0.00 | 2.90 | 37.6 | 0.0 | 1.75 |
| ARC017A | 0.50 | 0.0 | 21.5 | 2.50 | 9.00 | 5.10 | 60.3 | 0.0 | 0.90 |
| ARC025 | 0.25 | 0.0 | 20.0 | 37.5 | 6.00 | 2.90 | 31.4 | 0.0 | 1.75 |
| ARC031 | 0.20 | 0.0 | 21.5 | 2.50 | 9.00 | 5.50 | 60.9 | 0.0 | 0.20 |
| ARC053 | 0.63 | 0.0 | 21.5 | 2.50 | 9.00 | 3.60 | 59.0 | 3.0 | 0.63 |
| ARC054 | 0.45 | 5.0 | 19.0 | 8.00 | 6.35 | 3.50 | 53.5 | 3.0 | 1.00 |
| ARC056 | 1.25 | 0.0 | 18.0 | 2.50 | 9.00 | 4.50 | 64.1 | 0.0 | 0.50 |
| ARC067B | 0.25 | 0.0 | 20.0 | 18.5 | 9.00 | 2.90 | 47.4 | 0.0 | 1.75 |
| ARC076 | 0.09 | 1.5 | 21.0 | 8.00 | 9.00 | 3.50 | 54.0 | 2.0 | 0.80 |
| Alloy 625 | 0.20 | 0.0 | 21.5 | 2.50 | 9.00 | 3.60 | 62.8 | 0.0 | 0.20 |
| Alloy 718 | 0.50 | 0.0 | 19.0 | 18.5 | 3.00 | 5.10 | 52.8 | 0.0 | 0.90 |
| Alloy 725 | 0.09 | 0.0 | 20.9 | 7.91 | 7.92 | 3.48 | 58.0 | 0.0 | 1.57 |

TABLE 2

| | Properties for Partially Solutioned Heat Treated Materials | | | | | | | | | | | |
|---|---|---|---|---|---|---|---|---|---|---|---|---|
| Alloy | Grain Size (microns) | R.T. Y.S. (ksi) | R.T. UTS (ksi) | R.T. Elong. to Fail (%) | 750° F. Y.S. (ksi) | 750° F. UTS (ksi) | 750° F. Elong. to Fail (%) | 1100° F. Y.S. (ksi) | 1100° F. UTS (ksi) | 1100° F. Elong. to Fail (%) | 1100° F. Air Static Crack Growth Time to fail (h) | 1100° F. Steam Static Crack Growth Time to fail (h) |
| ARC009 | 14 | 148 | 174 | 10 | 136 | 157 | 10 | 126 | 146 | 13 | | 3360 |
| ARC017A | 5 | 177 | 221 | 12 | 160 | 210 | 17 | 155 | 207 | 21 | | 1680 |
| ARC025 | 12 | 147 | 186 | 9 | 143 | 171 | 8 | 138 | 165 | 10 | | 1120 |
| ARC031 | 12 | 147 | 192 | 28 | 132 | 174 | 27 | 129 | 180 | 36 | 1680 | 1680 |
| ARC053 | 48/8* | 149 | 191 | 11 | 146 | 190 | 19 | 142 | 193 | 24 | 97 | 236 |

TABLE 2-continued

Properties for Partially Solutioned Heat Treated Materials

| Alloy | Grain Size (microns) | R.T. Y.S. (ksi) | R.T. UTS (ksi) | R.T. Elong. to Fail (%) | 750° F. Y.S. (ksi) | 750° F. UTS (ksi) | 750° F. Elong. to Fail (%) | 1100° F. Y.S. (ksi) | 1100° F. UTS (ksi) | 1100° F. Elong. to Fail (%) | 1100° F. Air Static Crack Growth Time to fail (h) | 1100° F. Steam Static Crack Growth Time to fail (h) |
|---|---|---|---|---|---|---|---|---|---|---|---|---|
| ARC054 | 10 | 150 | 206 | 26 | 140 | 192 | 23 | 135 | 189 | 29 | 2139 | 1680 |
| ARC056 | 34/10* | 144 | 198 | 26 | 133 | 184 | 28 | 131 | 192 | 24 | 244 | 208 |
| ARC067B | 6 | 139 | 194 | 13 | 141 | 188 | 15 | 139 | 187 | 19 | | 323 |
| ARC076 | | 158 | 202 | 26 | 143 | 180 | 23 | | | | | 230 |
| Alloy 625 | 10 | 113 | 170 | 43 | 94 | 147 | 40 | 95 | 151 | 39 | 840 | 1680 |
| Alloy 718 | 5 | 164 | 212 | 27 | 146 | 184 | 22 | 142 | 176 | 28 | | 20 |
| Alloy 725 | 28/5* | 177 | 220 | 14 | 163 | 202 | 16 | 157 | 200 | 21 | | 2139 |

*Bimodal particle size distribution observed

TABLE 3

Properties for Fully Solutioned Heat Treated Materials

| Alloy | Grain Size (microns) | R.T. Y.S. (ksi) | R.T. UTS (ksi) | R.T. Elong. to Fail (%) | 750° F. Y.S. (ksi) | 750° F. UTS (ksi) | 750° F. Elong. to Fail (%) | 1100° F. Y.S. (ksi) | 1100° F. UTS (ksi) | 1100° F. Elong. to Fail (%) | 1100° F. Air Static Crack Growth Time to fail (h) | 1100° F. Steam Static Crack Growth Time to fail (h) |
|---|---|---|---|---|---|---|---|---|---|---|---|---|
| ARC009 | 40 | 146 | 184 | 22 | 131 | 163 | 17 | 125 | 154 | 22 | | 18 |
| ARC017A | 40 | 155 | 212 | 28 | 141 | 189 | 25 | 141 | 194 | 21 | | 183 |
| ARC025 | 50 | 131 | 165 | 10 | 120 | 152 | 14 | 119 | 149 | 13 | | 248 |
| ARC031 | 50 | 146 | 189 | 37 | 129 | 162 | 33 | 127 | 167 | 33 | 76 | 56 |
| ARC053 | 60 | 127 | 181 | 28 | 101 | 149 | 31 | 109 | 165 | 29 | 1120 | 1680 |
| ARC054 | 60 | 165 | 206 | 27 | 144 | 179 | 26 | 139 | 178 | 22 | 65 | 54 |
| ARC056 | 60 | 121 | 184 | 38 | 109 | 165 | 36 | 108 | 165 | 26 | 312 | 234 |
| ARC067B | 90 | 108 | 162 | 20 | 100 | 146 | 31 | 100 | 144 | 27 | | 3360 |
| ARC076 | 80 | 142 | 187 | 29 | 123 | 161 | 29 | 118 | 160 | 29 | | 324 |
| Alloy 625 | 60 | 102 | 162 | 45 | 82 | 134 | 43 | 75 | 127 | 49 | | 1680 |
| Alloy 718 | 45 | 168 | 202 | 24 | 149 | 173 | 20 | 145 | 167 | 20 | | 4 |
| Alloy 725 | 56 | 149 | 209 | 25 | 136 | 181 | 25 | 133 | 173 | 19 | | 74 |

While various embodiments are described herein, it will be appreciated from the specification that various combinations of elements, variations, or improvements therein may be made by those skilled in the art, and are within the scope of the invention. For example, the nickel-base superalloy of the present invention may be used to form articles other than turbine components, for which the combination of strength and resistance to high temperature time-dependent crack growth are desired.

What is claimed is:

1. An article formed from a nickel-base superalloy, said nickel-base superalloy containing a γ" tetragonal phase and comprising: between about 0.05 and about 2.0 weight percent aluminum; from about 1.5 to about 5 weight percent cobalt; between about 15 and about 25 weight percent chromium; up to about 40 weight percent iron; from about 6 to about 12 weight percent molybdenum; between about 2 and about 7 weight percent niobium; from about 2 to about 3 weight percent tantalum; up to about 2.5 weight percent titanium; and the balance nickel, wherein said article has a time dependent crack propagation resistance of at least about 20 hours to failure at about 1100° F. in the presence of steam.

2. The article of claim 1, wherein said article has a yield strength of greater than 130 ksi at about 750° F.

3. The article of claim 2, wherein said article has a yield strength of greater than 146 ksi at about 750° F.

4. The article of claim 3, wherein said yield strength is at least 160 ksi at about 750° F.

5. The article of claim 1, further comprising cobalt.

6. The article of claim 1, wherein said nickel-base superalloy comprises: between about 0.1 and about 0.6 weight percent aluminum; from about 1.5 to about 5 weight percent cobalt; between about 19 and about 22 weight percent chromium; up to about 8.0 weight percent iron; between about 6 and about 9 weight percent molybdenum; between at least 3.5 and about 5.1 weight percent niobium; from about 2 to about 3 weight percent tantalum; between about 0.6 and about 2.0 weight percent titanium; and a balance of nickel.

7. The article of claim 6, wherein said nickel-base superalloy comprises: between about 0.1 and about 0.5 weight percent aluminum; from about 1.5 to about 5 weight percent cobalt; between about 19 and about 21 weight percent chromium; about 8.0 weight percent iron; between about 6 and about 9 weight percent molybdenum; between at least 3.5 and about 5.1 weight percent niobium; from about 2 to about 3 weight percent tantalum; between about 0.8 and about 1.0 weight percent titanium; and a balance of nickel.

8. The article of claim 7, wherein said nickel-base superalloy comprises: about 0.5 weight percent aluminum; about 5 weight percent cobalt; about 19 weight percent chromium; about 8 weight percent iron; about 6.4 weight percent molybdenum; about 3.5 weight percent niobium; about 3 weight percent tantalum; about 1.0 weight percent titanium; and a balance of nickel.

9. The article of claim 1, wherein said nickel-base superalloy comprises: between about 0.2 and about 0.6 weight percent aluminum; from about 1.5 to about 5 weight percent cobalt; between about 19 and about 22 weight percent chromium; up to about 8.0 weight percent iron; between about 6 and about 9 weight percent molybdenum; between at least 3.6 and about 5.5 weight percent niobium; from about 2 to about 3 weight percent tantalum; between about 0.6 and about 2.0 weight percent titanium; and a balance of nickel.

10. The article of claim 9, wherein said nickel-base superalloy comprises: between about 0.2 and about 0.6 weight percent aluminum; from about 1.5 to about 5 weight percent cobalt; about 21.5 weight percent chromium; about 2.5 weight percent iron; about 9 weight percent molybdenum; between at least 3.6 and about 5.5 weight percent niobium; from about 2 to about 3 weight percent tantalum; between about 0.6 and about 2.0 weight percent titanium; and a balance of nickel.

11. The article of claim 10, wherein said nickel-base superalloy comprises: about 0.5 weight percent aluminum; from about 1.5 to about 5 weight percent cobalt; about 21.5 weight percent chromium; about 2.5 weight percent iron; about 9 weight percent molybdenum; about 5.1 weight percent niobium; from about 2 to about 3 weight percent tantalum; about 0.9 weight percent titanium; and a balance of nickel.

12. The article of claim 1, wherein said nickel-base superalloy further comprises: at least one element selected from the group consisting of tungsten, rhenium, and vanadium.

13. The article of claim 12, wherein said nickel-base superalloy further comprises up to about 3 weight percent tungsten.

14. The article of claim 12, wherein said nickel-base superalloy further comprises up to about 3 weight percent rhenium.

15. [A] The article of claim 12, wherein said nickel-base superalloy further comprises up to about 1 weight percent vanadium.

16. The article of claim 1, wherein said nickel-base superalloy further comprises at least one element selected from the group consisting of carbon, manganese, magnesium, boron, silicon, and zirconium.

17. The article of claim 1, wherein said article has a crack propagation resistance of at least 200 hours to failure at about 1100° F. in the presence of steam.

18. The article of claim 1, wherein said article is a turbine engine component.

19. The article of claim 18, wherein said turbine engine component is a component selected from the group consisting of compressor rotors, compressor vanes, compressor stators, combustor cans, nozzles, turbine discs, turbine wheels, and buckets.

20. The article of claim 18, wherein said turbine engine component is a component in a land-based turbine engine.

21. The article of claim 18, wherein said turbine engine component is a component in an aircraft turbine engine.

22. A nickel-base superalloy for forming an article, said nickel-base superalloy containing a γ" tetragonal phase and comprising: between about 0.05 and about 2.0 weight percent aluminum; from about 1.5 to about 5 weight percent cobalt; between about 15 and about 25 weight percent chromium; up to about 40 weight percent iron; from about 6 to about 12 weight percent molybdenum; between about 2 and about 7 weight percent niobium; from about 2 to about 3 weight percent tantalum; up to about 2.5 weight percent titanium; and the balance nickel, wherein said nickel-base superalloy has a crack propagation resistance of at least 20 hours to failure at about 1100° F. in the presence of steam and a yield strength of greater than 130 ksi at about 750° F.

23. The nickel-base superalloy of claim 22, wherein said nickel-base superalloy has a yield strength of greater than 146 ksi at about 750° F.

24. The nickel-base superalloy of claim 22, wherein said yield strength is at least 160 ksi at about 750° F.

25. The nickel-base superalloy of claim 22, wherein said crack propagation resistance is at least 200 hours to failure at about 1100° F. in the presence of steam.

26. The nickel-base superalloy of claim 22, wherein said nickel-base superalloy comprises: between about 0.1 and about 0.6 weight percent aluminum; from about 1.5 to about 5 weight percent cobalt; between about 19 and about 22 weight percent chromium; up to about 8.0 weight percent iron; between about 6 and about 9 weight percent molybdenum; from 3.5 to about 5.1 weight percent niobium; from about 2 to about 3 weight percent tantalum; between about 0.6 and about 2.0 weight percent titanium; and a balance of nickel.

27. The nickel-base superalloy of claim 26, wherein said nickel-base superalloy comprises: between about 0.1 and about 0.5 weight percent aluminum; from about 1.5 to about 5 weight percent cobalt; between about 19 and about 21 weight percent chromium; about 8.0 weight percent iron; between about 6 and about 9 weight percent molybdenum; between at least 3.5 and about 5.1 weight percent niobium; from about 2 to about 3 weight percent tantalum; between about 0.8 and about 1.0 weight percent titanium; and a balance of nickel.

28. The nickel-base superalloy of claim 27, wherein said nickel-base superalloy comprises: about 0.5 weight percent aluminum; about 5 weight percent cobalt; about 19 weight percent chromium; about 8 weight percent iron; about 6.4 weight percent molybdenum; about 3.5 weight percent niobium; about 3 weight percent tantalum; about 1.0 weight percent titanium; and a balance of nickel.

29. The nickel-base superalloy of claim 22, wherein said nickel-base superalloy comprises: between about 0.2 and about 0.6 weight percent aluminum; from about 1.5 to about 5 weight percent cobalt, between about 19 and about 22 weight percent chromium; up to about 8.0 weight percent iron; between about 6 and about 9 weight percent molybdenum; between at least 3.6 and about 5.5 weight percent niobium; from about 2 to about 3 weight percent tantalum; between about 0.6 and about 2.0 weight percent titanium; and a balance of nickel.

30. The nickel-base superalloy of claim 29, wherein said nickel-base superalloy comprises: between about 0.2 and about 0.6 weight percent aluminum; from about 1.5 to about 5 weight percent cobalt; about 21.5 weight percent chromium; about 2.5 weight percent iron; about 9 weight percent molybdenum; between at least 3.6 and about 5.5 weight percent niobium; from about 2 to about 3 weight percent tantalum; between about 0.6 and about 2.0 weight percent titanium; and a balance of nickel.

31. The nickel-base superalloy of claim 30, wherein said nickel-base superalloy comprises: about 0.5 weight percent aluminum; from about 1.5 to about 5 weight percent cobalt; about 21.5 weight percent chromium; about 2.5 weight percent iron; about 9 weight percent molybdenum; about 5.1 weight percent niobium; from about 2 to about 3 weight percent tantalum; about 0.9 weight percent titanium; and a balance of nickel.

32. An article formed from a nickel-base superalloy, the nickel-base superalloy containing a γ" tetragonal phase and comprising between about 0.05 and about 2.0 weight percent aluminum; from about 1.5 to about 5 weight percent cobalt; between about 15 and about 25 weight percent chromium; up to about 40 weight percent iron; from about 6 to about 12 weight percent molybdenum; between about 2 and about 7 weight percent niobium; from about 2 to about 3 weight percent tantalum; up to about 2.5 weight percent titanium; and the balance nickel, wherein said article has a time dependent crack propagation resistance of at least 20 hours to failure at about 1100° F. in the presence of steam and a yield strength of greater than 130 ksi at about 750° F.

33. The article of claim 32, wherein said article has a yield strength of greater than 146 ksi at about 750° F.

34. The article of claim 32, wherein said yield strength is at least 160 ksi at about 750° F.

35. The article of claim 32, wherein said crack propagation resistance is least 200 hours to failure at about 1100° F. in the presence of steam.

36. The article of claim 32, wherein said nickel-base superalloy comprises: between about 0.1 and about 0.6 weight percent aluminum; from about 1.5 to about 5 weight percent cobalt; between about 19 and about 22 weight percent chromium; up to about 8.0 weight percent iron; between about 6 and about 9 weight percent molybdenum; between at least 3.5 and about 5.1 weight percent niobium; from about 2 to about 3 weight percent tantalum; between about 0.6 and about 2.0 weight percent titanium; and a balance of nickel.

37. The article of claim 36, wherein said nickel-base superalloy comprises: between about 0.1 and about 0.5 weight percent aluminum; from about 1.5 to about 5 weight percent cobalt; between about 19 and about 21 weight percent chromium; about 8.0 weight percent iron; between about 6 and about 9 weight percent molybdenum; between at least 3.5 and about 5.1 weight percent niobium; from about 2 to about 3 weight percent tantalum; between about 0.8 and about 1.0 weight percent titanium; and a balance of nickel.

38. The article of claim 37, wherein said nickel-base superalloy comprises: about 0.5 weight percent aluminum; about 5 weight percent cobalt; about 19 weight percent chromium; about 8 weight percent iron; about 6.4 weight percent molybdenum; about 3.5 weight percent niobium; about 3 weight percent tantalum; about 1.0 weight percent titanium; and a balance of nickel.

39. The article of claim 36, wherein said nickel-base superalloy comprises: between about 0.2 and about 0.6 weight percent aluminum; from about 1.5 to about 5 weight percent cobalt; between about 19 and about 22 weight percent chromium; up to about 8.0 weight percent iron; between about 6 and about 9 weight percent molybdenum; between at least 3.6 and about 5.5 weight percent niobium; from about 2 to about 3 weight percent tantalum; between about 0.6 and about 2.0 weight percent titanium; and a balance of nickel.

40. The article of claim 39, wherein said nickel-base superalloy comprises: between about 0.2 and about 0.6 weight percent aluminum; from about 1.5 to about 5 weight percent cobalt; about 21.5 weight percent chromium; about 2.5 weight percent iron; about 9 weight percent molybdenum; between at least 3.6 and about 5.5 weight percent niobium; from about 2 to about 3 weight percent tantalum; between about 0.6 and about 2.0 weight percent titanium; and a balance of nickel.

41. The article of claim 40, wherein said nickel-base superalloy comprises: about 0.5 weight percent aluminum; from about 1.5 to about 5 weight percent cobalt; about 21.5 weight percent chromium; about 2.5 weight percent iron; about 9 weight percent molybdenum; about 5.1 weight percent niobium; from about 2 to about 3 weight percent tantalum; about 0.9 weight percent titanium; and a balance of nickel.

42. The article of claim 32, wherein said nickel-base superalloy further comprises at least one element selected from the group consisting of tungsten, rhenium, and vanadium.

43. The article of claim 42, wherein said nickel-base superalloy further comprises up to about 3 weight percent tungsten.

44. [A] The article of claim 42, wherein said nickel-base superalloy further comprises up to about 3 weight percent rhenium.

45. The article of claim 42, wherein said nickel-base superalloy further comprises up to about 1 weight percent vanadium.

46. The article of claim 32, wherein said article is a turbine engine component.

47. The article of claim 46, wherein said turbine engine component is a component selected from the group consisting of compressor rotors, compressor vanes, compressor stators, combustor cans, nozzles, turbine discs, turbine wheels, and buckets.

48. The article of claim 46, wherein said turbine engine component is a component in a land-based turbine engine.

49. The article of claim 46, wherein said turbine engine component is a component in an aircraft turbine engine.

50. An article formed from a nickel-base superalloy, said nickel-base superalloy containing a γ" tetragonal phase and comprising: between about 0.05 and about 2.0 weight percent aluminum; from about 1.5 to about 5 weight percent cobalt; between about 15 and about 25 weight percent chromium; up to about 40 weight percent iron; from about 6 to about 12 weight percent molybdenum; between about 2 and about 7 weight percent niobium; from about 2 to about 3 weight percent tantalum; up to about 2.5 weight percent titanium; and the balance nickel, wherein said article has a time dependent crack propagation resistance of at least about 20 hours to failure at about 1100° F. in the presence of steam, and wherein said article is formed by: forming an ingot of the nickel-base superalloy; remelting the ingot a first time; remelting the ingot a second time; homogenizing the ingot by heat treating the ingot at a first temperature below a melting temperature of the nickel-base superalloy; billetizing the ingot, thereby creating a billet; hot-working the billet; and solution treating the billet at a second temperature below a solvus temperature of a high temperature phase of the superalloy to form the nickel-base superalloy article.

51. The article of claim 50, wherein the second temperature is below a δ-solvus temperature of the nickel-base superalloy.

52. The article of claim 50, wherein said article is a turbine engine component.

53. The article of claim 52, wherein said turbine engine component is a component selected from the group consisting of compressor rotors, compressor vanes, compressor stators, combustor cans, nozzles, turbine discs, turbine wheels, and buckets.

54. The article of claim 52, wherein said turbine engine component is a component in a land-based turbine engine.

55. The article of claim 52, wherein said turbine engine component is a component in an aircraft turbine engine.

56. The article of claim 52, wherein said article has a diameter of at least about 20 inches.

57. A nickel-base superalloy, said nickel-base superalloy containing a γ" tetragonal phase and comprising: between about 0.05 and about 2.0 weight percent aluminum; from about 1.5 to about 5 weight percent cobalt; between about 15 and about 25 weight percent chromium; up to about 40 weight percent iron; from about 6 to about 12 weight percent molybdenum; between about 2 and about 7 weight percent niobium; from about 2 to about 3 weight percent tantalum; up to about 2.5 weight percent titanium; and the balance nickel, wherein said nickel-base superalloy has a time dependent crack propagation resistance of at least about 20 hours to failure at about 1100° F. in the presence of steam, and wherein said nickel-base superalloy is formed by: forming an ingot of the nickel-base superalloy; remelting the ingot a first time; remelting the ingot a second time; homogenizing the ingot to a first temperature below a melting temperature of the nickel-base superalloy; billetizing the ingot, thereby creating a billet; hot-working the billet; and solution treating the billet at a second temperature below a solvus temperature of a high temperature phase of the superalloy.

58. The nickel-base alloy of claim 57, wherein the second temperature is below a δ-solvus temperature of the nickel-base superalloy.

*59. A turbine engine component formed from a nickel-base superalloy, the nickel-base superalloy including a γ″ tetragonal phase, the nickel-base superalloy comprising, in weight percent:*

*between about 0.05 and about 0.5 percent aluminum, cobalt is present and is present in a concentration up to about 5 percent, between about 19 and 22 percent chromium, up to about 8 percent iron, between about 6 and about 9 percent molybdenum, between about 3.3 and about 5.4 percent niobium, tantalum is present and is present in a concentration of up to 3 percent, between about 0.2 and about 1.6 percent titanium and the balance nickel; and*

*wherein the nickel-base superalloy comprising the turbine engine component has a crack propagation resistance of at least about 200 hours to failure at 1100° F. in the presence of steam and a yield strength of at least about 130 ksi at a temperature of 750° F.*

*60. The turbine engine component of claim 59 wherein the nickel-base superalloy comprises:*

*about 0.5 percent aluminum, about 21.5 percent chromium, about 2.5 percent iron, about 9 percent molybdenum, about 5.1 percent niobium about 0.9 percent titanium and the balance nickel;*

*wherein the nickel-base superalloy comprising the engine component has a crack propagation resistance of at least about 1680 hours to failure at 1100° F. in the presence of steam; and*

*wherein the nickel-base superalloy comprising the engine component has a yield strength of at least about 160 ksi at a temperature of 750° F., a room temperature yield strength of at least about 177 ksi and a room temperature ultimate tensile strength of at least about 221 ksi.*

*61. The turbine engine component of claim 60 wherein the γ″ tetragonal phase providing the crack propagation resistance at 1100° F., the yield strength at 750° F., the room temperature yield strength and the room temperature ultimate tensile strength is achieved by first homogenizing the nickel-base superalloy, then shaping the superalloy at a temperature below the homogenization temperature, then solutioning the shaped superalloy at a temperature below a δ-solvus temperature or Laves solvus temperature of the shaped superalloy to partially solution the shaped superalloy to precipitate in a matrix the phase that is primarily γ″ tetragonal.*

*62. The turbine engine component of claim 59 wherein the nickel-base superalloy comprises:*

*about 0.5 percent aluminum, about 21.5 percent chromium, about 2.5 percent iron, about 9 percent molybdenum, about 5.1 percent niobium about 0.9 percent titanium and the balance nickel;*

*wherein the nickel-base superalloy comprising the engine component has a crack propagation resistance of at least about 1680 hours to failure at 1100° F. in the presence of steam; and*

*wherein the nickel-base superalloy comprising the engine component has a grain size of less than about 5 microns.*

*63. The turbine engine component of claim 62 wherein the γ″ tetragonal phase providing the crack propagation resistance at 1100° F., and grain size is achieved by first homogenizing the nickel-base superalloy, then shaping the superalloy at a temperature below the homogenization temperature, then solutioning the shaped superalloy at a temperature below a δ-solvus temperature or Laves solvus temperature of the shaped superalloy to partially solution the shaped superalloy to precipitate in a matrix the phase that is primarily γ″ tetragonal.*

*64. A turbine engine component formed from a nickel-base superalloy, said nickel-base superalloy including a γ″ tetragonal phase, the nickel-base superalloy comprising, in weight percent,*

*about 0.5 percent aluminum, cobalt is present, about 19 percent chromium, about 18.5 percent iron, about 3 percent molybdenum, about 5.1 percent niobium, about 0.9 percent titanium, tantalum is present and is present in a concentration of up to about 3 percent and the balance nickel;*

*wherein the nickel-base superalloy comprising the engine component has a crack propagation resistance of at least about 200 hours to failure at 1100° F. in the presence of steam; and*

*wherein the nickel-base superalloy comprising the engine component has a yield strength of at least about 146 ksi at a temperature of 750° F., a room temperature yield strength of at least about 164 ksi and a room temperature ultimate tensile strength of about 212 ksi.*

*65. The turbine engine component of claim 64 wherein the γ″ tetragonal phase providing the crack propagation resistance at 1100° F., the yield strength at 750° F., the room temperature yield strength and the room temperature ultimate tensile strength is achieved by first homogenizing the nickel-base superalloy, then shaping the superalloy at a temperature below the homogenization temperature, then solutioning the shaped superalloy at a temperature below a δ-solvus temperature or Laves solvus temperature of the shaped superalloy to partially solution the shaped superalloy to precipitate in a matrix the phase that is primarily γ″ tetragonal.*

*66. A turbine engine component formed from a nickel-base superalloy, said nickel-base superalloy including a γ″ tetragonal phase, the nickel-base superalloy comprising, in weight percent:*

*about 0.5 percent aluminum, cobalt is present, about 19 percent chromium, about 18.5 percent iron, about 3 percent molybdenum, about 5.1 percent niobium, about 0.9 percent titanium, tantalum is present and is present in a concentration of up to 3 percent and the balance nickel;*

*wherein the nickel-base superalloy comprising the engine component has a crack propagation resistance of at least about 200 hours to failure at 1100° F. in the presence of steam and a yield strength of at least about 130 ksi at a temperature of 750° F.; and*

*wherein the nickel-base superalloy comprising the engine component has a grain size of less than about 5 microns.*

*67. The turbine engine component of claim 66 wherein the γ″ tetragonal phase providing the crack propagation resis-*

*tance at 1100° F., and the grain size is achieved by first homogenizing the nickel-base superalloy, then shaping the superalloy at a temperature below the homogenization temperature, then solutioning the shaped superalloy at a temperature below a δ-solvus temperature or Laves solvus temperature of the shaped superalloy to partially solution the shaped superalloy to precipitate in a matrix the phase that is primarily γ″ tetragonal.*

*68. A turbine engine component formed from a nickel-base superalloy, said nickel-base superalloy including a γ″ tetragonal phase, the nickel-base superalloy comprising, in weight percent:*

*about 0.09 percent aluminum, cobalt is present, about 20.9 percent chromium, about 7.91 percent iron, about 7.92 percent molybdenum, about 3.48 percent niobium, about 1.57 percent titanium, tantalum is present and is present in a concentration of up to 3 percent and the balance nickel;*

*wherein the nickel-base superalloy comprising the engine component has a crack propagation resistance of at least about 2139 hours to failure at 1100° F. in the presence of steam; and*

*wherein the nickel-base superalloy comprising the engine component has a yield strength of at least about 163 ksi at a temperature of 750° F., a room temperature yield strength of at least about 177 ksi and a room temperature ultimate tensile strength of at least about 220 ksi.*

*69. The turbine engine component of claim 68 wherein the γ″ tetragonal phase providing the crack propagation resistance at 1100° F., the yield strength at 750° F., the room temperature yield strength and the room temperature ultimate tensile strength is achieved by first homogenizing the nickel-base superalloy, then shaping the superalloy at a temperature below the homogenization temperature, then solutioning the shaped superalloy at a temperature below a δ-solvus temperature or Laves solvus temperature of the shaped superalloy to partially solution the shaped superalloy to precipitate in a matrix the phase that is primarily γ″ tetragonal.*

*70. A turbine engine component formed from a nickel-base superalloy, said nickel-base superalloy including a γ″ tetragonal phase, the nickel-base superalloy comprising, in weight percent:*

*about 0.09 percent aluminum, cobalt is present, about 20.9 percent chromium, about 7.91 percent iron, about 7.92 percent molybdenum, about 3.48 percent niobium, about 1.57 percent titanium, tantalum is present and is present in a concentration of up to 3 percent and the balance nickel;*

*wherein the nickel-base superalloy comprising the engine component has a crack propagation resistance of at least about 2139 hours to failure at 1100° F. in the presence of steam and a yield strength of at least about 130 ksi at a temperature of 750° F.; and*

*wherein the nickel-base superalloy comprising the engine component has a grain size of less than about 28 microns.*

*71. The turbine engine component of claim 70 wherein the γ″ tetragonal phase providing the crack propagation resistance at 1100° F., and grain size is achieved by first homogenizing the nickel-base superalloy, then shaping the superalloy at a temperature below the homogenization temperature, then solutioning the shaped superalloy at a temperature below a δ-solvus temperature or Laves solvus temperature of the shaped superalloy to partially solution the shaped superalloy to precipitate in a matrix the phase that is primarily γ″ tetragonal.*

*72. A turbine disc for a gas turbine engine comprising:*

*a nickel-base superalloy including a γ″ tetragonal phase and having a composition, in weight percent, of between about 0.05 and about 0.5 percent aluminum, cobalt is present and is present in a concentration up to about 5 percent, between about 19 and 22 percent chromium, up to about 8 percent iron, between about 6 and about 9 percent molybdenum, between about 3.3 and about 5.4 percent niobium, tantalum is present and is present in a concentration of up to 3 percent, between about 0.2 and about 1.6 percent titanium and the balance nickel;*

*wherein the nickel-base superalloy comprising the turbine engine component has a crack propagation resistance of at least about 200 hours to failure at 1100° F. in the presence of steam and a yield strength of at least about 130 ksi at a temperature of 750° F.; and*

*wherein the γ″ tetragonal phase providing the crack propagation resistance at 1100° F. is achieved by first homogenizing the nickel-base superalloy, then shaping the superalloy at a temperature below the homogenization temperature, then solutioning the shaped superalloy at a temperature below a δ-solvus temperature or Laves solvus temperature of the shaped superalloy to partially solution the shaped superalloy to precipitate in a matrix the phase that is primarily γ″ tetragonal.*

*73. The turbine disc of claim 72 wherein the nickel-base superalloy comprises about 0.5 percent aluminum, about 21.5 percent chromium, about 2.5 percent iron, about 9 percent molybdenum, about 5.1 percent niobium about 0.9 percent titanium and the balance nickel;*

*wherein the nickel-base superalloy has a crack propagation resistance of at least about 1680 hours to failure at 1100° F. in the presence of steam; and*

*wherein the nickel-base superalloy further has a yield strength of at least about 160 ksi at a temperature of 750° F., a room temperature yield strength of at least about 177 ksi and a room temperature ultimate tensile strength of at least about 221 ksi.*

*74. The turbine disc of claim 72 wherein the nickel-base superalloy comprises about 0.5 percent aluminum, about 21.5 percent chromium, about 2.5 percent iron, about 9 percent molybdenum, about 5.1 percent niobium about 0.9 percent titanium and the balance nickel;*

*wherein the nickel-base superalloy has a crack propagation resistance of at least about 1680 hours to failure at 1100° F. in the presence of steam; and*

*wherein the nickel-base superalloy further has a grain size of less than about 5 microns.*

*75. A turbine disc for a gas turbine engine comprising:*

*a nickel-base superalloy including a γ″ tetragonal phase and having a composition, in weight percent, about 0.5 percent aluminum, cobalt is present, about 19 percent chromium, about 18.5 percent iron, about 3 percent molybdenum, about 5.1 percent niobium, about 0.9 percent titanium, tantalum is present and is present in a concentration of up to 3 percent and the balance nickel;*

*wherein the nickel-base superalloy comprising the turbine disc has a crack propagation resistance of at least about 200 hours to failure at 1100° F. in the presence of steam;*

*wherein the nickel-base superalloy comprising the turbine disc has a yield strength of at least about 146 ksi at a temperature of 750° F., a room temperature yield strength of at least about 164 ksi and a room temperature ultimate tensile strength of at least about 212 ksi; and*

*wherein the γ" tetragonal phase providing the crack propagation resistance at 1100° F., the yield strength at 750°, the room temperature yield strength and the room temperature ultimate tensile strength is achieved by first homogenizing the nickel-base superalloy, then shaping the superalloy at a temperature below the homogenization temperature, then solutioning the shaped superalloy at a temperature below a δ-solvus temperature or Laves solvus temperature of the shaped superalloy to partially solution the shaped superalloy to precipitate in a matrix the phase that is primarily γ" tetragonal.*

*76. A turbine disc for a gas turbine engine comprising:*

*a nickel-base superalloy including a γ" tetragonal phase and having a composition, in weight percent, about 0.5 percent aluminum, cobalt is present, about 19 percent chromium, about 18.5 percent iron, about 3 percent molybdenum, about 5.1 percent niobium, about 0.9 percent titanium, tantalum is present and is present in a concentration of up to 3 percent and the balance nickel;*

*wherein the nickel-base superalloy comprising the turbine disc has a crack propagation resistance of at least about 200 hours to failure at 1100° F. in the presence of steam and a yield strength of at least about 130 ksi at a temperature of 750° F.;*

*wherein the nickel-base superalloy comprising the turbine disc has a grain size of less than about 5 microns; and*

*wherein the γ" tetragonal phase providing the crack propagation resistance at 1100° F., the yield strength at 750°, the room temperature yield strength and the room temperature ultimate tensile strength is achieved by first homogenizing the nickel-base superalloy, then shaping the superalloy at a temperature below the homogenization temperature, then solutioning the shaped superalloy at a temperature below a δ-solvus temperature or Laves solvus temperature of the shaped superalloy to partially solution the shaped superalloy to precipitate in a matrix the phase that is primarily γ" tetragonal.*

*77. A turbine disc for a gas turbine engine comprising:*

*a nickel-base superalloy including a γ" tetragonal phase and having a composition, in weight percent, of about 0.09 percent aluminum, cobalt is present, about 20.9 percent chromium, about 7.91 percent iron, about 7.92 percent molybdenum, about 3.48 percent niobium, about 1.57 percent titanium, tantalum is present and is present in a concentration of up to 3 percent and the balance nickel;*

*wherein the nickel-base superalloy comprising the turbine disc has a crack propagation resistance of at least about 2139 hours to failure at 1100° F. in the presence of steam;*

*wherein the nickel-base superalloy comprising the turbine disc has a yield strength of at least about 163 ksi at a temperature of 750° F., a room temperature yield strength of at least about 177 ksi and a room temperature ultimate tensile strength of about 220 ksi; and*

*wherein the γ" tetragonal phase providing the crack propagation resistance at 1100° F., the yield strength at 750°, the room temperature yield strength and the room temperature ultimate tensile strength is achieved by first homogenizing the nickel-base superalloy, then shaping the superalloy at a temperature below the homogenization temperature, then solutioning the shaped superalloy at a temperature below a δ-solvus temperature or Laves solvus temperature of the shaped superalloy to partially solution the shaped superalloy to precipitate in a matrix the phase that is primarily γ" tetragonal.*

*78. A turbine disc for a gas turbine engine comprising:*

*a nickel-base superalloy including a γ" tetragonal phase and having a composition, in weight percent, of about 0.09 percent aluminum, cobalt is present, about 20.9 percent chromium, about 7.91 percent iron, about 7.92 percent molybdenum, about 3.48 percent niobium, about 1.57 percent titanium, tantalum is present and is present in a concentration of up to 3 percent and the balance nickel;*

*wherein the nickel-base superalloy comprising the turbine disc has a crack propagation resistance of at least about 2139 hours to failure at 1100° F. in the presence of steam and a yield strength of at least about 130 ksi at a temperature of 750° F.;*

*wherein the nickel-base superalloy comprising the turbine disc has a grain size of less than about 28 microns; and*

*wherein the γ" tetragonal phase providing the crack propagation resistance at 1100° F., the yield strength at 750°, the room temperature yield strength and the room temperature ultimate tensile strength is achieved by first homogenizing the nickel-base superalloy, then shaping the superalloy at a temperature below the homogenization temperature, then solutioning the shaped superalloy at a temperature below a δ-solvus temperature or Laves solvus temperature of the shaped superalloy to partially solution the shaped superalloy to precipitate in a matrix the phase that is primarily γ" tetragonal.*

*79. A turbine engine component formed from a nickel-base superalloy, the nickel-base superalloy including a γ" tetragonal phase, the nickel-base superalloy comprising, in weight percent:*

*between about 0.1 and about 0.6 percent aluminum, cobalt is present and is present in a concentration up to about 5 percent, between about 19 and 22 percent chromium, up to about 8 percent iron, between about 6 and about 9 percent molybdenum, between about 3.5 and about 5.1 percent niobium, tantalum is present and is present in a concentration of up to 3 percent, between about 0.6 and about 2.0 percent titanium and the balance nickel;*

*wherein the nickel-base alloy comprising the turbine engine component has a crack propagation resistance of at least about 200 hours to failure at 1100° F. in the presence of steam and a yield strength of at least about 130 ksi at a temperature of 750° F.; and*

*wherein the γ" tetragonal phase providing the crack propagation resistance at 1100° F. is achieved by first homogenizing the nickel-base superalloy, then shaping the superalloy at a temperature below the homogenization temperature, then solutioning the shaped superalloy at a temperature below a δ-solvus temperature or Laves solvus temperature of the shaped superalloy to partially solution the shaped superalloy to precipitate in a matrix the phase that is primarily γ" tetragonal.*

*80. A turbine engine component formed from a nickel-base superalloy, the nickel-base superalloy containing a γ" tetragonal phase, the nickel-base superalloy comprising, in weight percent:*

*between about 0.2 and about 0.6 percent aluminum, cobalt is present and is present in a concentration up to about 5 percent, between about 19 and 22 percent chromium, up to about 8 percent iron, between about 6*

*and about 9 percent molybdenum, between about 3.6 and about 5.5 percent niobium, tantalum is present and is present in a concentration of up to 3 percent, between about 0.6 and about 2.0 percent titanium and the balance nickel;*

*wherein the nickel-base superalloy comprising the turbine engine component has a crack propagation resistance of at least about 200 hours to failure at 1100° F. in the presence of steam and a yield strength of at least about 130 ksi at a temperature of 750° F.; and*

*wherein the γ" tetragonal phase providing the crack propagation resistance at 1100° F. is achieved by first homogenizing the nickel-base superalloy, then shaping the superalloy at a temperature below the homogenization temperature, then solutioning the shaped superalloy at a temperature below a δ-solvus temperature or Laves solvus temperature of the shaped superalloy to partially solution the shaped superalloy to in a matrix the phase that is primarily γ" tetragonal.*

*81. The turbine engine component of claim 80 wherein the nickel-base superalloy includes about 21.5 percent chromium, about 2.5 percent iron and about 9 percent molybdenum.*

*82. A turbine disc for a gas turbine engine comprising:*

*a nickel-base superalloy including a γ" tetragonal phase and having a composition, in weight percent, of between about 0.2 and about 0.6 percent aluminum, cobalt is present and is present in a concentration up to about 5 percent, between about 19 and 22 percent chromium, up to about 8 percent iron, between about 6 and about 9 percent molybdenum, between about 3.6 and about 5.5 percent niobium, tantalum is present and is present in a concentration of up to 3 percent, between about 0.6 and about 2.0 percent titanium and the balance nickel;*

*wherein the nickel-base superalloy comprising the turbine disc has a crack propagation resistance of at least about 200 hours to failure at 1100° F. in the presence of steam and a yield strength of at least about 130 ksi at a temperature of 750° F.; and*

*wherein the γ" tetragonal phase providing the crack propagation resistance at 1100° F. is achieved by first homogenizing the nickel-base superalloy, then shaping the superalloy at a temperature below the homogenization temperature, then solutioning the shaped superalloy at a temperature below a δ-solvus temperature or Laves solvus temperature of the shaped superalloy to partially solution the shaped superalloy to precipitate in a matrix the phase that is primarily γ" tetragonal.*

*83. The turbine disc of claim 82 wherein the nickel-base superalloy includes about 21.5 percent chromium, about 2.5 percent iron and about 9 percent molybdenum.*

* * * * *

UNITED STATES PATENT AND TRADEMARK OFFICE

CERTIFICATE OF CORRECTION

PATENT NO. : RE 40,501 E
APPLICATION NO. : 11/077572
DATED : September 16, 2008
INVENTOR(S) : Henry et al.

It is certified that error appears in the above-identified patent and that said Letters Patent is hereby corrected as shown below:

Column 11, Line 23, "alloy further comprises: at least one element selected from" should be changed to --alloy further comprises at least one element selected from--.

Column 16, Line 19, "weight percent," should be changed to --weight percent:--.

Signed and Sealed this

Fifteenth Day of September, 2009

David J. Kappos

David J. Kappos
*Director of the United States Patent and Trademark Office*